United States Patent
Du et al.

(10) Patent No.: US 10,180,981 B2
(45) Date of Patent: Jan. 15, 2019

(54) SYNCHRONOUS AUDIO PLAYBACK METHOD, APPARATUS AND SYSTEM

(71) Applicant: Huawei Technologies Co., Ltd., Shenzhen (CN)

(72) Inventors: Zhengzhong Du, Shenzhen (CN); Xiangjun Wang, Shenzhen (CN); Qing Zhang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 14/729,355

(22) Filed: Jun. 3, 2015

(65) Prior Publication Data

US 2015/0363411 A1    Dec. 17, 2015

(30) Foreign Application Priority Data

Jun. 12, 2014 (CN) .......................... 2014 1 0261954

(51) Int. Cl.
G06F 17/00 (2006.01)
G06F 17/30 (2006.01)
(Continued)

(52) U.S. Cl.
CPC .......... *G06F 17/3074* (2013.01); *G11B 27/10* (2013.01); *H04M 19/08* (2013.01);
(Continued)

(58) Field of Classification Search
CPC .... G06F 14/3074; G11B 27/10; H04M 19/08; H04N 21/4307; H04N 21/8113; H04R 3/00
(Continued)

(56) References Cited

U.S. PATENT DOCUMENTS 8,374,365 B2 * 2/2013 Goodwin .............. G10L 19/173
381/17
8,379,868 B2 * 2/2013 Goodwin .............. G10L 19/008
381/17
(Continued)

FOREIGN PATENT DOCUMENTS

CN          1742492 A      3/2006
CN        102301748 A     12/2011
(Continued)

OTHER PUBLICATIONS

Foreign Communication From a Counterpart Application, European Application No. 15166836.5, Extended European Search Report dated Aug. 7, 2015, 7 pages.
(Continued)

*Primary Examiner* — Paul C McCord
(74) *Attorney, Agent, or Firm* — Conley Rose, P.C.

(57) ABSTRACT

A synchronous audio playback method, apparatus and system are provided. The method includes calculating a first playback delay generated when an audio file is played; acquiring a second playback delay; calculating a delay offset; calculating a data adjustment amount; adding to-be-adjusted data to or deleting to-be-adjusted data from a current to-be-played part of the audio file according to a value of the delay offset, to obtain a replacement part corresponding to the current to-be-played part, where a data amount of the to-be-adjusted data is the data adjustment amount; and playing the replacement part. With the technical solutions of the present invention, playback duration of a current to-be-played part can be adjusted in a manner of adding or deleting data, so that a controlling device and a controlled device generate sounds simultaneously when playing a to-be-played clip in a very simple implementation process.

17 Claims, 2 Drawing Sheets

(51) Int. Cl.
*G11B 27/10* (2006.01)
*H04R 3/00* (2006.01)
*H04M 19/08* (2006.01)
*H04N 21/43* (2011.01)
*H04N 21/81* (2011.01)

(52) U.S. Cl.
CPC .......... *H04R 3/00* (2013.01); *H04N 21/4307* (2013.01); *H04N 21/8113* (2013.01)

(58) Field of Classification Search
USPC .......................................................... 700/94
See application file for complete search history.

(56) References Cited

U.S. PATENT DOCUMENTS

| | | | |
|---|---|---|---|
| 8,855,101 B2* | 10/2014 | Chen .................. | G01S 5/18 370/338 |
| 2002/0044665 A1* | 4/2002 | Mantegna ......... | H04L 29/06027 381/58 |
| 2006/0156374 A1 | 7/2006 | Hu et al. | |
| 2007/0087686 A1 | 4/2007 | Holm et al. | |
| 2008/0131076 A1 | 6/2008 | Hashimoto | |
| 2009/0290064 A1 | 11/2009 | Matsumoto et al. | |
| 2012/0053714 A1* | 3/2012 | Wu .................... | H04S 1/007 700/94 |
| 2012/0083911 A1* | 4/2012 | Louboutin ............ | G06F 1/1632 700/94 |
| 2013/0066451 A1* | 3/2013 | Ganesan .............. | H04B 1/0007 700/94 |
| 2013/0177168 A1* | 7/2013 | Inha ...................... | H04N 5/602 381/92 |
| 2015/0256958 A1* | 9/2015 | Nguyen .................. | H04S 3/00 381/303 |
| 2016/0198281 A1* | 7/2016 | Oh ........................ | H04S 3/00 381/310 |

FOREIGN PATENT DOCUMENTS

| | | |
|---|---|---|
| CN | 104467928 A | 3/2015 |
| EP | 2136576 A2 | 12/2009 |
| JP | 2008029002 A | 2/2008 |
| JP | 2010004520 A | 1/2010 |
| WO | 2008011230 A2 | 1/2008 |

OTHER PUBLICATIONS

Foreign Communication From a Counterpart Application, Korean Application No. 10-2015-0073742, Korean Office Action dated Mar. 9, 2016, 4 pages.

Foreign Communication From a Counterpart Application, Korean Application No. 10-2015-0073742, English Translation of Korean Office Action dated Mar. 22, 2016, 5 pages.

Partial English Translation and Abstract of Japanese Patent Application No. JPA2010004520, Jul. 28, 2016, 63 pages.

Foreign Communication From a Counterpart Application, Japanese Application No. 2015-119576, Japanese Office Action dated May 24, 2016, 4 pages.

Foreign Communication From a Counterpart Application, Japanese Application No. 2015-119576, English Translation of Japanese Office Action dated May 24, 2016, 4 pages.

Partial English Translation and Abstract of Chinese Patent Application No. CN104467928A, 2015, 13 pages.

Levien, R., "Audio Buffer Size," May 14, 2013, 3 pages.

Foreign Communication From a Counterpart Application, Chinese Application No. 201410261954.8, Chinese Office Action dated Dec. 7, 2017, 7 pages.

* cited by examiner

SYNCHRONOUS AUDIO PLAYBACK METHOD, APPARATUS AND SYSTEM

CROSS-REFERENCE TO RELATED APPLICATION

This application claims priority to Chinese Patent Application No. 201410261954.8, filed with the Chinese Patent Office on Jun. 12, 2014, which is incorporated herein by reference in its entirety.

TECHNICAL FIELD

The present invention relates to the multimedia field, and in particular, to a synchronous audio playback method, apparatus and system.

BACKGROUND

With the development of multimedia technologies, in an increasing number of application scenarios, multiple devices need to be used to constitute a synchronous playback system for synchronous audio playback, to implement synchronization of sounds played from the multiple devices, so as to implement a function and an effect that are difficult to be implemented by a single device. For example, synchronous audio playback performed by a synchronous playback system constituted by multiple mobile phones can implement effects that cannot be implemented by a single mobile phone, such as multi-channel surround sound and mobile phone speaker array.

In the prior art, an audio playback manner generally used by a synchronous playback system is controlling devices in the synchronous playback system to play an audio file simultaneously. The prior art has the following characteristic, when an audio file is played in a synchronous playback system, the audio file is generally divided into several audio clips, and then the audio clips are played one by one. However, playback of each audio clip requires processing procedures such as decoding, audio mixing, digital signal processing (DSP), and output, and therefore, there is a time difference from start of playback of an audio clip to actual generation of a sound, and this time difference is a playback delay. A value of the playback delay is determined by a hardware configuration and a software environment of a device, and when hardware configurations or software environments of various devices are different, values of playback delays are also different.

Because playback delays of various devices are different, when various devices start to play a same audio clip simultaneously, sounds are actually generated by the various devices at different time points. When hardware configurations or software environments between various devices differ greatly, a time deviation in actual generation of sounds also becomes large. For example, in a case in which a HUAWEI MATE1 mobile phone and a HUAWEI HONOR mobile phone start to decode a same audio clip simultaneously, a time difference in actual generation of sounds may be 130 milliseconds (ms) to 168 ms. Further, a time deviation between various devices is generated when each audio clip is played, and with an increasing number of played audio clips, the time deviation in actual generation of sounds between various devices gradually accumulates. As a result, the problem of time inconsistency between various devices in actual generation of sounds becomes increasingly serious, which makes it difficult to implement synchronous audio playback.

SUMMARY

Embodiments of the present invention provide a synchronous audio playback method, apparatus and system, in order to resolve a problem that synchronous audio playback is very difficult when playback delays of various devices are different.

According to a first aspect, an embodiment of the present invention provides a synchronous audio playback method, where the method is executed by a controlled device in a synchronous playback system, where the synchronous playback system includes the controlled device and a controlling device; and the method includes calculating a first playback delay $D_1$ generated when an audio file is played; acquiring a second playback delay $D_2$ generated when the controlling device plays the audio file; calculating a delay offset Offset, where Offset=$D_1-D_2$; when Offset is not 0, calculating a data adjustment amount corresponding to an absolute value of Offset; adding to-be-adjusted data to or deleting to-be-adjusted data from a current to-be-played part of the audio file according to a value of Offset, to obtain a replacement part corresponding to the current to-be-played part, where a data amount of the to-be-adjusted data is the data adjustment amount; and playing the replacement part.

With reference to the first aspect, in a first possible implementation manner of the first aspect, the calculating a first playback delay $D_1$ generated when an audio file is played includes, when playback duration of the audio file reaches first preset duration, calculating the first playback delay $D_1$ generated when the audio file is played; or when second preset duration expires after a previous data addition or data deletion operation is performed on the to-be-played part, calculating the first playback delay $D_1$ generated when the audio file is played.

With reference to the first aspect or the first possible implementation manner of the first aspect, in a second possible implementation manner of the first aspect, the calculating a first playback delay $D_1$ generated when an audio file is played at a preset time point includes acquiring a time length T that the audio file has been played, a time length E(t) corresponding to data that has been accumulatively written to audio mixing and DSP processing hardware since playback of the audio file started, a time length F(t) corresponding to buffer data in the audio mixing and DSP processing hardware, and a time length G(t) corresponding to buffer data in audio playback hardware; and calculating $D_1$ according to T, E(t), F(t) and G(t), where $D_1=T-E(t)+F(t)+G(t)$.

With reference to the first aspect, the first possible implementation manner of the first aspect or the second possible implementation manner of the first aspect, in a third possible implementation manner of the first aspect, the adding to-be-adjusted data to or deleting to-be-adjusted data from a current to-be-played part of the audio file according to a value of Offset, where a data amount of the to-be-adjusted data is the data adjustment amount, includes, when Offset is less than 0, adding the to-be-adjusted data whose data amount is the data adjustment amount to the current to-be-played part of the audio file; or when Offset is greater than 0, deleting the to-be-adjusted data whose data amount is the data adjustment amount from the current to-be-played part of the audio file.

With reference to the first aspect, the first possible implementation manner of the first aspect or the second possible implementation manner of the first aspect, in a fourth possible implementation manner of the first aspect, the adding to-be-adjusted data to or deleting to-be-adjusted data from a current to-be-played part of the audio file according to a value of Offset, where a data amount of the to-be-adjusted data is the data adjustment amount, includes decoding the current to-be-played part to generate decoded data; and when Offset is less than 0, adding the to-be-adjusted data whose data amount is the data adjustment amount to the decoded data; or when Offset is greater than 0, deleting the to-be-adjusted data whose data amount is the data adjustment amount from the decoded data.

According to a second aspect, an embodiment of the present invention provides a synchronous audio playback apparatus, where the apparatus includes a calculating unit configured to calculate a first playback delay $D_1$ generated when an audio file is played; an acquiring unit configured to acquire a second playback delay $D_2$ generated when a controlling device plays the audio file; a generating unit configured to calculate a delay offset Offset according to $D_1$ obtained by the calculating unit and $D_2$ acquired by the acquiring unit, where Offset=$D_1-D_2$; a determining unit configured to, when Offset generated by the generating unit is not 0, calculate a data adjustment amount corresponding to an absolute value of Offset; an adjusting unit configured to add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount obtained by the determining unit; and a playing unit configured to play the replacement part generated by the adjusting unit.

With reference to the second aspect, in a first possible implementation manner of the second aspect, the calculating unit includes an acquiring subunit configured to acquire a time length T that the audio file has been played, a time length $E(t)$ corresponding to data that has been accumulatively written to audio mixing and DSP processing hardware since playback of the audio file started, a time length $F(t)$ corresponding to buffer data in the audio mixing and DSP processing hardware, and a time length $G(t)$ corresponding to buffer data in audio playback hardware; and a calculating subunit configured to calculate $D_1$ according to T, $E(t)$, $F(t)$ and $G(t)$ acquired by the acquiring subunit, where $D_1=T-E(t)+F(t)+G(t)$.

With reference to the second aspect or the first possible implementation manner of the second aspect, in a second possible implementation manner of the second aspect, the adjusting unit is configured to, when Offset is less than 0, add the to-be-adjusted data whose data amount is the data adjustment amount to the current to-be-played part of the audio file; or when Offset is greater than 0, delete the to-be-adjusted data whose data amount is the data adjustment amount from the current to-be-played part of the audio file.

With reference to the second aspect or the first possible implementation manner of the second aspect, in a third possible implementation manner of the second aspect, the adjusting unit includes a decoding subunit configured to decode the current to-be-played part to generate decoded data; and an adjusting subunit configured to, when Offset is less than 0, add the to-be-adjusted data whose data amount is the data adjustment amount to the decoded data; or when Offset is greater than 0, delete the to-be-adjusted data whose data amount is the data adjustment amount from the decoded data.

According to a third aspect, an embodiment of the present invention provides a synchronous audio playback system, where the system includes a controlling device and a controlled device, where the controlling device is configured to calculate a second playback delay $D_2$ generated when the controlling device plays the audio file; and the controlled device is configured to calculate a first playback delay $D_1$ generated when the audio file is played; acquire $D_2$; calculate a delay offset $D_2$, where Offset=$D_1-D_2$; when Offset is not 0, calculate a data adjustment amount corresponding to an absolute value of Offset; add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount; and play the replacement part.

In the embodiments of the present invention, a first playback delay $D_1$ generated when an audio file is played is calculated; a second playback delay $D_2$ generated when a controlling device plays the audio file is acquired; a delay offset Offset is calculated, where Offset=$D_1-D_2$; when Offset is not 0, a data adjustment amount corresponding to an absolute value of Offset is calculated; to-be-adjusted data whose data amount is the data adjustment amount is added to or deleted from a current to-be-played part of the audio file according to a value of Offset, to obtain a replacement part corresponding to the current to-be-played part; and the replacement part is played. With the technical solutions of the present invention, when a controlled device plays a current to-be-played part, playback duration of the current to-be-played part may be adjusted in a manner of adding or deleting data, so as to eliminate a time deviation in sound generation that has been generated between the controlled device and a controlling device, so that the controlling device and the controlled device generate sounds simultaneously when playing a to-be-played clip, and synchronous playback of a to-be-played file by the controlling device and the controlled device is implemented in a very simple implementation process.

BRIEF DESCRIPTION OF DRAWINGS

To describe the technical solutions in the embodiments of the present invention more clearly, the following briefly introduces the accompanying drawings required for describing the embodiments or the prior art. A person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
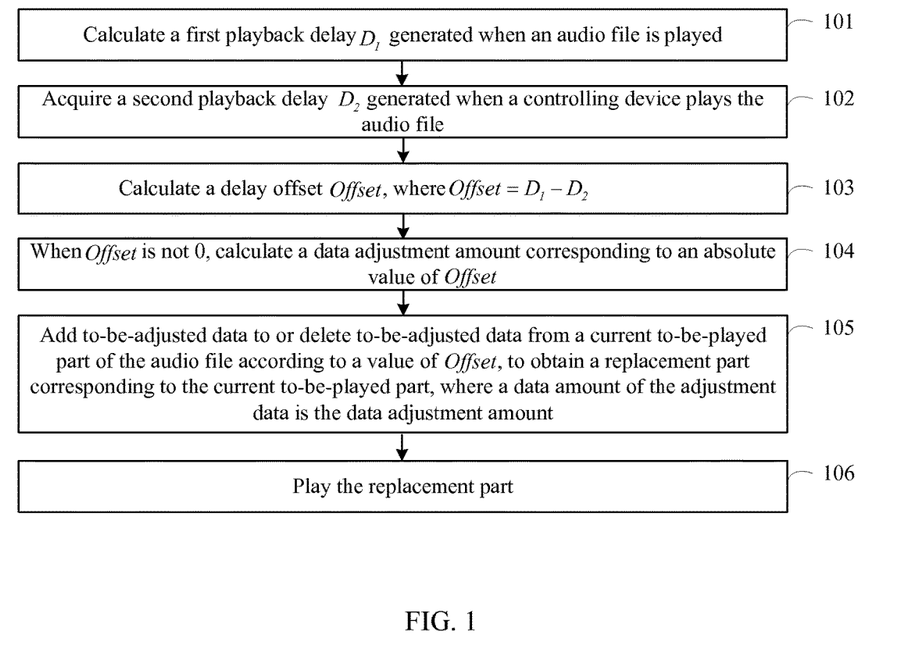
FIG. 1 is a flowchart of an embodiment of a synchronous audio playback method according to the present invention.

Referring to FIG. 1, FIG. 1 is a flowchart of an embodiment of a synchronous audio playback method according to the present invention. When a synchronous playback system includes multiple playback devices, one of the multiple playback devices may be selected as a controlling device, and the rest of the devices are used as controlled devices. The controlled device plays an audio file by using the method in this embodiment, which can implement synchronous playback between the controlled device and the controlling device, so as to implement synchronous playback among various devices in the synchronous playback system. The audio file may be an independent audio file, or may also be an audio part in a multimedia file. The method includes the following steps.

Step 101: Calculate a first playback delay $D_1$ generated when an audio file is played.

Before the first playback delay is calculated, it is determined first whether a preset adjustment condition is met. If the adjustment condition is met, the first playback delay is calculated and a subsequent synchronization process is executed; if the adjustment condition is not met, decoded data may be played directly. The preset adjustment condition may include that playback duration of the audio file reaches first preset duration $T_0$, or that second preset duration $T_1$ expires after a previous data addition or data deletion operation is performed on a to-be-played part, or the like, where values of the two constants may be: $T_0$=300 ms, and $T_1$=1 second (s). For example, when the playback duration of the audio file reaches the first preset duration $T_0$, the first playback delay $D_1$ generated when the audio file is played is calculated.

A calculation formula for the first playback delay $D_1$ is as follows: $D_1$=T−E(t)+F(t)+G(t)+E(t) G(t). When $D_1$ is calculated, T, E(t), G(t) and F(t) may be acquired first, and then $D_1$ is obtained through calculation.

T is a time length that the audio file has been played currently when a to-be-played audio clip is decoded.

E(t) is a time length corresponding to data that has been accumulatively written to audio mixing and DSP hardware of a controlled device since playback of the audio file started. E(t) may be acquired by using an application programming interface (API) function of an operating system of the controlled device. For example, when the operating system of the device is an ANDROID system, E(t) may be acquired by using the API function android.media.AudioTrack.getPlaybackHeadPosition( ).

G(t) is a time length corresponding to buffer data in audio playback hardware of the controlled device when the to-be-played audio clip is decoded, where G(t) is not greater than a time length HB corresponding to a maximum data amount that can be buffered by the audio playback hardware, and is generally equal to HB. A value of HB may be obtained through measurement by using a software method.

F(t) is a time length corresponding to buffer data in the audio mixing and DSP processing hardware of the controlled device when the to-be-played audio clip is decoded, where F(t) is not greater than a time length FB corresponding to a maximum data amount that can be buffered by the audio mixing and DSP processing hardware, and is generally equal to FB. A value of FB may be obtained by using an offline delay measurement method. For example, when the device is a mobile phone, FB may be measured in the following manner. A finger strikes a play button on a mobile phone screen with a considerable force, a finger striking sound is recorded by using a microphone connected to a computer, and a time point $t_1$ is recorded; a mobile phone program receives a play button click instruction, and records a time point $t_2$; the mobile phone program starts to repeatedly perform audio decoding and playback, and records a start time point $t_3$; the mobile phone program outputs an audio signal for the first time; a loudspeaker starts to generate a sound, a sound signal of the loudspeaker is recorded by using the microphone connected to the computer, and a start time point $t_4$ is recorded; a playback delay is Delay=($t_4$−$t_1$)−($t_3$−$t_2$)−($t_2$−$t_1$), where ($t_4$−$t_1$) may be read from the audio signals recorded by the microphone, ($t_3$−$t_2$) is read from the records in the mobile phone program, and ($t_2$−$t_1$) may be generally ignored because it is extremely small; because Delay=T−E(t)+FB+G(t), FB can be obtained through calculation.

A time length corresponding to a data amount may be calculated by using the following formula:

$$t = \frac{D \times 1000}{N \times P \times H},$$

where t is a time length measured in ms; D is a data amount measured in bits; N is a quantity of sound channels; P is a quantity of bits per unit of data, measured in bits; and H is a sampling rate measured in Hertz (Hz).

It should be noted herein that $D_1$ may also be obtained through calculation in another manner, which is not described in detail herein.

Step 102: Acquire a second playback delay $D_2$ that has been generated in a process in which a controlling device plays the audio file.

The second playback delay $D_2$ is generated by the controlling device, and a generating manner of the second playback delay $D_2$ is similar to that of the first playback delay $D_1$, which is not repeatedly described herein again.

Step 103: Calculate a delay offset Offset, where Offset=$D_1$−$D_2$.

The delay offset Offset between the controlled device and the controlling device is calculated, where Offset=$D_1$−$D_2$. The delay offset is a time difference between a time when the controlled device actually generates a sound and a time when the controlling device actually generates a sound.

Step 104: When Offset is not 0, calculate a data adjustment amount corresponding to an absolute value of Offset.

If Offset is not 0, it is indicated that there is a time difference between a time when the controlled device actually generates a sound and a time when the controlling device actually generates a sound. In this case, a quantity K of audio frames corresponding to the absolute value of Offset may be obtained through calculation according to a playback time corresponding to each audio frame of the current to-be-played part, that is, the data adjustment amount may be the quantity of audio frames. In general, when the absolute value of Offset is less than a preset value, for example, when the preset value is 20 ms, a time difference in sound generation between the controlled device and the controlling device is within an acceptable range. Therefore, the data adjustment amount corresponding to the absolute value of Offset may also be calculated when the absolute value of Offset is greater than or equal to the preset value.

In actual use, a playback time corresponding to an audio frame may be relatively long, for example, in advanced audio coding (AAC), a playback time corresponding to an AAC audio frame is generally 22.32 ms. In an application scenario with a high synchronous playback requirement, an adjustment effect by directly adding or deleting audio frames is relatively poor, which cannot meet the requirement of synchronous playback. As a result, the data adjustment amount corresponding to the absolute value of Offset may be calculated so as to implement precise adjustment. The data adjustment amount corresponding to the absolute value of Offset may be calculated by using the foregoing formula $$t = \frac{D \times 1000}{N \times P \times H},$$

where the absolute value of Offset is t in the formula, D is the data adjustment amount corresponding to the absolute value of Offset, that is, the data adjustment amount may also be a quantity of bits. In actual use, when the absolute value of Offset is less than 20 ms, a time difference in sound generation between the controlled device and the controlling device is within an acceptable range; therefore, the data adjustment amount corresponding to the absolute value of the time difference Offset may be an interval range.

In actual use, when the absolute value of Offset is less than a preset value, for example, when the preset value is 20 m s a time difference in sound generation between the controlled device and the controlling device is within an acceptable range; therefore, the data adjustment amount corresponding to the absolute value of Offset may not be a definite value. For example, the data adjustment amount may be a value within a preset value interval, where the preset value interval may be determined by the absolute value of Offset. For example, an upper limit of the preset value interval may be the absolute value of Offset plus a data amount corresponding to the preset value, and a lower limit of the preset value interval may be the absolute value of Offset minus the data amount corresponding to the preset value. When the data adjustment amount corresponding to the absolute value of Offset is calculated, a preset value interval may be obtained through calculation according to the absolute value of Offset and the preset value, and then a value is selected from the preset value interval to serve as the data adjustment amount corresponding to the absolute value of Offset.

Step 105: Add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount.

If the delay offset Offset is greater than 0, it is indicated that playback by the controlled device is slower than that by the controlling device, that is, a time when the controlled device generates a sound is later than a time when the controlling device generates a sound. In this case, the controlled device may delete the to-be-adjusted data whose data amount is the data adjustment amount from the current to-be-played part, for example, delete K audio frames; after the deletion operation is complete, a quantity of the current to-be-played part becomes smaller, and playback duration is reduced, where the reduced duration is Offset, so that the delay offset can be eliminated, and the controlled device and the controlling device can generate sounds synchronously.

If the delay offset Offset is smaller than 0, it is indicated that playback by the controlled device is faster than that by the controlling device, that is, a time when the controlled device generates a sound is earlier than a time when the controlling device generates a sound. In this case, the controlled device may add the to-be-adjusted data whose data amount is the data adjustment amount to the current to-be-played part, for example, add K audio frames; after the addition operation is complete, a quantity of the current to-be-played part becomes larger, and playback duration is increased, where the increased duration is Offset, so that the delay offset can be eliminated, and the controlled device and the controlling device can generate sounds synchronously.

For more precise adjustment, the decoded data corresponding to the current to-be-played part may be adjusted. The current to-be-played part is decoded to generate the decoded data. When Offset is less than 0, the to-be-adjusted data whose data amount is the data adjustment amount is added to the decoded data; or when Offset is greater than 0, the to-be-adjusted data whose data amount is the data adjustment amount is deleted from the decoded data, so as to implement precise adjustment.

In actual use, when the absolute value of Offset is less than a preset value, for example, when the preset value is 20 ms a time difference in sound generation between the controlled device and the controlling device is within an acceptable range. Therefore, that the absolute value of Offset is less than the preset value is acceptable, and the current to-be-played part does not need to be adjusted. The to-be-adjusted data needs to be added to or deleted from the current to-be-played part only when the absolute value of Offset is greater than the preset value. When there are multiple controlled devices, some of the various devices may generate sounds earlier than the controlling device, and some devices may generate sounds later than the controlling device. When the absolute value of Offset is greater than half the preset value, for example, when the half of the preset value is 10 ms, the to-be-adjusted data may be added to or deleted from the current to-be-played part, in order that a time difference in sound generation between the controlled devices falls within an acceptable range.

Step 106: Play the replacement part.

The playing includes playback steps such as data decoding, audio mixing, DSP processing, and sound playing that are performed on the current to-be-played part. If a manner of adjusting decoded data is used to adjust the current to-be-played part, the playing may include only playback steps such as audio mixing, DSP processing and sound playing. A specific process of playing the replacement part is not further described herein.

It can be learnt from the foregoing embodiment that a first playback delay $D_1$ generated when an audio file is played is calculated; a second playback delay $D_2$ generated when a controlling device plays the audio file is acquired; a delay offset Offset is calculated, where Offset=$D_1-D_2$; when Offset is not 0, a data adjustment amount corresponding to an absolute value of Offset is calculated; to-be-adjusted data whose data amount is the data adjustment amount is added to or deleted from a current to-be-played part of the audio file according to a value of Offset, to obtain a replacement part corresponding to the current to-be-played part; and the replacement part is played. With this embodiment, when a controlled device plays a current to-be-played part, playback duration of the current to-be-played part may be adjusted in a manner of adding or deleting data, so as to eliminate a time deviation in sound generation that has been generated between the controlled device and a controlling device, so that the controlling device and the controlled device generate sounds simultaneously when playing a to-be-played clip, and synchronous playback of a to-be-played file by the controlling device and the controlled device is implemented in a very simple implementation process.

Figure 2:
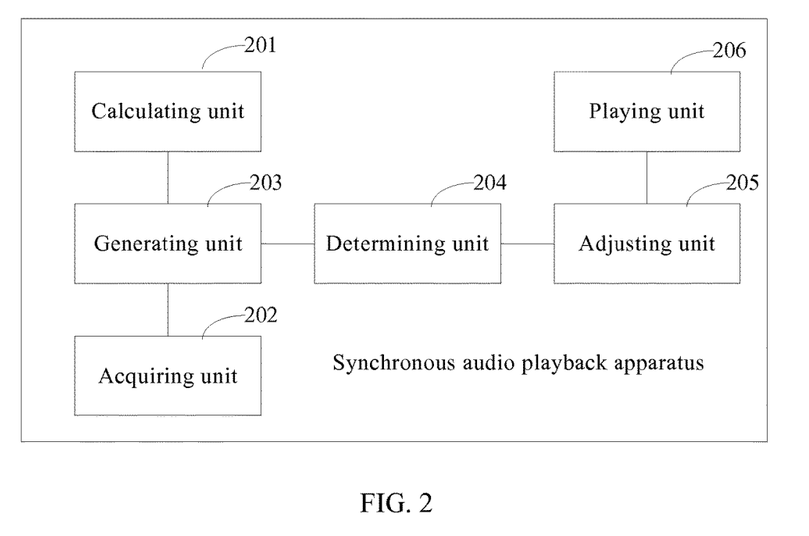
FIG. 2 is a schematic diagram of an embodiment of a synchronous audio playback apparatus according to the present invention.

Referring to FIG. 2, FIG. 2 is a schematic diagram of an embodiment of a synchronous audio playback apparatus according to the present invention.

As shown in FIG. 2, the apparatus includes a calculating unit 201, an acquiring unit 202, a generating unit 203, a determining unit 204, an adjusting unit 205, and a playing unit 206.

The calculating unit 201 is configured to calculate a first playback delay $D_1$ generated when an audio file is played.

The calculating unit 201 may include an acquiring subunit configured to acquire a time length T that the audio file has been played, a time length E(t) corresponding to data that has been accumulatively written to audio mixing and DSP processing hardware since playback of the audio file started, a time length F(t) corresponding to buffer data in the audio mixing and DSP processing hardware, and a time length G(t) corresponding to buffer data in audio playback hardware; and a calculating subunit configured to calculate $D_1$ according to T, E(t), F(t) and G(t) acquired by the acquiring subunit, where $D_1=T-E(t)+F(t)+G(t)$.

The acquiring unit 202 is configured to acquire a second playback delay $D_2$ generated when a controlling device plays the audio file.

The generating unit 203 is configured to calculate a delay offset Offset according to $D_1$ obtained by the calculating unit 201 and $D_2$ acquired by the acquiring unit 202, where $Offset=D_1-D_2$.

The determining unit 204 is configured to, when Offset generated by the generating unit 203 is not 0, calculate a data adjustment amount corresponding to an absolute value of Offset.

The adjusting unit 205 is configured to add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount obtained by the determining unit 204.

The adjusting unit 205 may be configured to, when Offset is less than 0, add the to-be-adjusted data whose data amount is the data adjustment amount to the current to-be-played part of the audio file; or when Offset is greater than 0, delete the to-be-adjusted data whose data amount is the data adjustment amount from the current to-be-played part of the audio file.

Alternatively, the adjusting unit 205 may include a decoding subunit configured to decode the current to-be-played part to generate decoded data; and an adjusting subunit configured to, when Offset is less than 0, add the to-be-adjusted data whose data amount is the data adjustment amount to the decoded data; or when Offset is greater than 0, delete the to-be-adjusted data whose data amount is the data adjustment amount from the decoded data.

The playing unit 206 is configured to play the replacement part generated by the adjusting unit 205.

It can be learnt from the foregoing embodiment that when a controlled device plays a current to-be-played part, playback duration of the current to-be-played part may be adjusted in a manner of adding or deleting data, so as to eliminate a time deviation in sound generation that has been generated between the controlled device and a controlling device, so that the controlling device and the controlled device generate sounds simultaneously when playing a to-be-played clip, and synchronous playback of a to-be-played file by the controlling device and the controlled device is implemented in a very simple implementation process.

Corresponding to the synchronous playback method and the synchronous playback apparatus, an embodiment of the present invention further provides a synchronous playback system.

Figure 3:
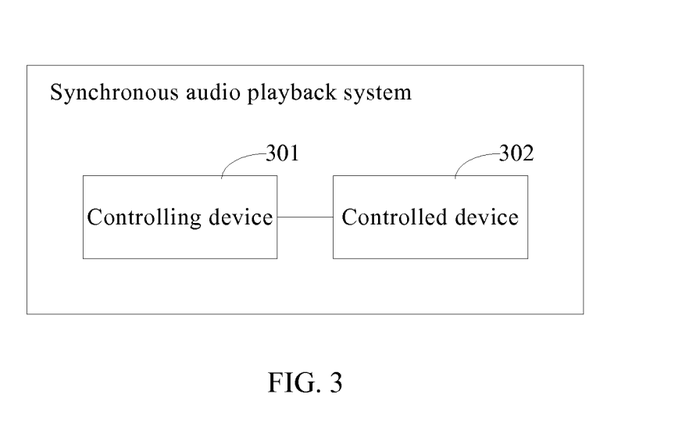
FIG. 3 is a schematic diagram of an embodiment of a synchronous audio playback system according to the present invention.

Referring to FIG. 3, FIG. 3 is a schematic diagram of an embodiment of a synchronous playback system according to the present invention.

The system includes a controlling device 301 and a controlled device 302.

The controlling device 301 is configured to calculate a second playback delay $D_2$ generated when the controlling device plays a audio file.

The controlled device 302 is configured to calculate a first playback delay $D_1$ generated when the audio file is played; acquire $D_2$; calculate a delay offset Offset, where $Offset=D_1-D_2$; when Offset is not 0, calculate a data adjustment amount corresponding to an absolute value of Offset; add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount; and play the replacement part.

The controlled device 302 is further configured to, when playback duration of the audio file reaches first preset duration, calculate the first playback delay $D_1$ generated when the audio file is played; or when second preset duration expires after a previous data addition or data deletion operation is performed on the to-be-played part, calculate the first playback delay $D_1$ generated when the audio file is played.

The controlled device 302 is further configured to acquire a time length T that the audio file has been played, a time length E(t) corresponding to data that has been accumulatively written to audio mixing and DSP processing hardware since playback of the audio file started, a time length F(t) corresponding to buffer data in the audio mixing and DSP processing hardware, and a time length G(t) corresponding to buffer data in audio playback hardware; and calculate $D_1$ according to T, E(t), F(t) and G(t), where $D_1=T-E(t)+F(t)+G(t)$.

The controlled device 302 is further configured to, when Offset is less than 0, add the to-be-adjusted data whose data amount is the data adjustment amount to the current to-be-played part of the audio file; or when Offset is greater than 0, delete the to-be-adjusted data whose data amount is the data adjustment amount from the current to-be-played part of the audio file.

The controlled device 302 is further configured to decode the current to-be-played part to generate decoded data; and when Offset is less than 0, add the to-be-adjusted data whose data amount is the data adjustment amount to the decoded data; or when Offset is greater than 0, delete the to-be-adjusted data whose data amount is the data adjustment amount from the decoded data.

It can be learnt from the foregoing embodiment that a controlled device can adjust decoded data, so as to eliminate a time deviation in sound generation that has been generated between the controlled device and a controlling device, so that the controlling device and the controlled device generate sounds simultaneously when playing a to-be-played clip, and synchronous playback of a to-be-played file by the controlling device and the controlled device is implemented. For different playback delays of various devices, synchronous audio playback can be implemented in a very easy way.

Figure 4:
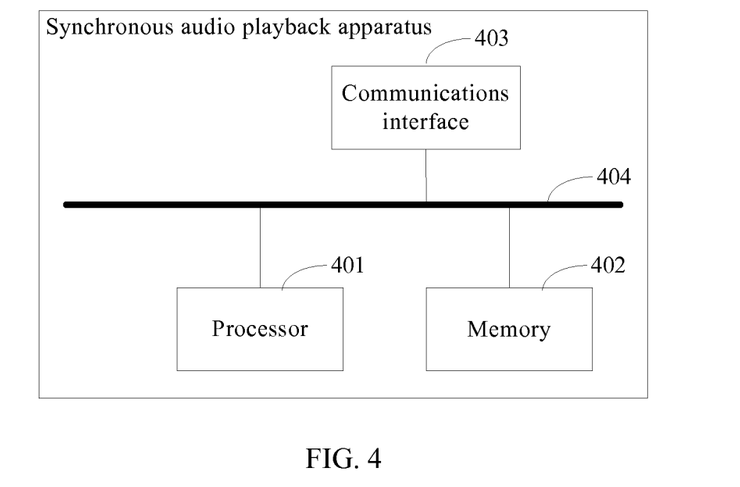
FIG. 4 is a schematic diagram of another embodiment of a synchronous audio playback apparatus according to the present invention.

Referring to FIG. 4, FIG. 4 is a schematic diagram of another embodiment of a synchronous audio playback apparatus according to the present invention.

As shown in FIG. 4, the synchronous audio playback apparatus includes a processor 401, a memory 402, and a communications interface 403, where the processor 401, the memory 402 and the communications interface 403 are connected through a bus 404. The synchronous audio playback apparatus may further include audio mixing and DSP processing hardware, and audio playback hardware.

The bus 404 may be a peripheral component interconnect (PCI) bus, an extended industry standard architecture (EISA) bus, or the like. The bus may be classified into an address bus, a data bus, a control bus, and the like. For ease of representation, the bus in FIG. 4 is represented by using only one bold line, which does not mean that there is only one bus or only one type of bus.

The memory 402 is configured to store a program. The program may include program code, where the program code includes computer operation instructions. The memory 402 may include a random access memory (RAM), and may also include a non-volatile memory, for example, at least one disk memory.

The processor 401 executes the program stored in the memory 402 and is configured to calculate a first playback delay $D_1$ generated when an audio file is played; acquire, by using the communications interface 403, a second playback delay $D_2$ generated when a controlling device plays the audio file; calculate a delay offset Offset, where Offset=$D_1$−$D_2$; when Offset is not 0, calculate a data adjustment amount corresponding to an absolute value of the Offset; add to-be-adjusted data to or delete to-be-adjusted data from a current to-be-played part of the audio file according to a value of Offset, to obtain a replacement part corresponding to the current to-be-played part, where a data amount of the to-be-adjusted data is the data adjustment amount; and play the replacement part.

The processor 401 is further configured to, when playback duration of the audio file reaches first preset duration, calculate the first playback delay $D_1$ generated when the audio file is played; or when second preset duration expires after a previous data addition or data deletion operation is performed on the to-be-played part, calculate the first playback delay $D_1$ generated when the audio file is played.

The processor 401 is further configured to acquire a time length T that the audio file has been played, a time length E(t) corresponding to data that has been accumulatively written to audio mixing and DSP processing hardware since playback of the audio file started, a time length F(t) corresponding to buffer data in the audio mixing and DSP processing hardware, and a time length G(t) corresponding to buffer data in audio playback hardware; and calculate $D_1$ according to T, E(t), F(t) and G(t), where $D_1$=T−E(t)+F(t)+G(t).

The processor 401 is further configured to, when Offset is less than 0, add the to-be-adjusted data whose data amount is the data adjustment amount to the current to-be-played part of the audio file; or when Offset is greater than 0, delete the to-be-adjusted data whose data amount is the data adjustment amount from the current to-be-played part of the audio file.

The processor 401 is further configured to decode the current to-be-played part to generate decoded data; and when Offset is less than 0, add the to-be-adjusted data whose data amount is the data adjustment amount to the decoded data; or when Offset is greater than 0, delete the to-be-adjusted data whose data amount is the data adjustment amount from the decoded data.

It can be learnt from the foregoing embodiment that when a controlled device plays a current to-be-played part, playback duration of the current to-be-played part may be adjusted in a manner of adding or deleting data, so as to eliminate a time deviation in sound generation that has been generated between the controlled device and a controlling device, so that the controlling device and the controlled device generate sounds simultaneously when playing a to-be-played clip, and synchronous playback of a to-be-played file by the controlling device and the controlled device is implemented in a very simple implementation process.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a read-only memory (ROM)/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the principle of the present invention shall fall within the protection scope of the present invention.

What the claim is:

1. A synchronous audio playback method, wherein the method is executed by a controlled device in a synchronous playback system, wherein the synchronous playback system comprises the controlled device and a controlling device, and wherein the method comprises:

calculating a first playback delay ($D_1$) generated when an audio file is played;

acquiring a second playback delay ($D_2$) generated when the controlling device plays the audio file;

calculating a delay offset (Offset), wherein the Offset=$D_1$−$D_2$;

calculating a data adjustment amount corresponding to an absolute value of the Offset when the Offset is not 0, wherein the data adjustment amount comprises a quantity of audio frames corresponding to the absolute value of the Offset, and wherein the data adjustment amount is calculated according to the following equation:

$$t = \frac{D \times 1000}{N \times P \times H}$$

where t is the absolute value of the Offset, D is the data adjustment amount corresponding to the absolute value of the Offset measured in bits, N is a quantity of sound channels, P is a quantity of bits per unit of data measured in bits, and H is a sampling rate measured in Hertz (Hz);

adding to-be-adjusted data to or deleting to-be-adjusted data from a current to-be-played part of the audio file according to a value of the Offset to obtain a replacement part corresponding to the current to-be-played part, wherein a data amount of the to-be-adjusted data is the data adjustment amount; and playing the replacement part.

2. The method according to claim 1, wherein calculating the first playback delay $D_1$ generated when the audio file is played comprises calculating the first playback delay $D_1$ generated when the audio file is played when playback duration of the audio file reaches first preset duration.

3. The method according to claim 1, wherein obtaining the replacement part comprises adding the to-be-adjusted data to the current to-be-played part of the audio file when the Offset is less than 0.

4. The method according to claim 1, wherein obtaining the replacement part comprises:
decoding the current to-be-played part to generate decoded data; and
adding the to-be-adjusted data to the decoded data when the Offset is less than 0.

5. A synchronous audio playback apparatus, comprising:
a processor; and
a communications interface,
wherein the communications interface is configured to receive a second playback delay ($D_2$) generated when a controlling device plays an audio file, and
wherein the processor is configured to:
calculate a first playback delay ($D_1$) generated when the audio file is played;
calculate a delay offset (Offset) according to $D_1$, wherein Offset=$D_1$−$D_2$;
calculate a data adjustment amount corresponding to an absolute value of the Offset when the Offset is not 0, wherein the data adjustment amount comprises a quantity of audio frames corresponding to the absolute value of the Offset, and wherein the data adjustment amount is calculated according to the following equation:

$$t = \frac{D \times 1000}{N \times P \times H}$$

where t is the absolute value of the Offset, D is the data adjustment amount corresponding to the absolute value of the Offset measured in bits, N is a quantity of sound channels, P is a quantity of bits per unit of data measured in bits, and H is a sampling rate measured in Hertz (Hz);
add to-be-adjusted data to or delete to-be-adjusted data from a current to-be-played part of the audio file according to a value of the Offset to obtain a replacement part corresponding to the current to-be-played part, wherein a data amount of the to-be-adjusted data is the data adjustment amount; and
play the replacement part.

6. The apparatus according to claim 5, wherein the processor is further configured to add the to-be-adjusted data to the current to-be-played part of the audio file when the Offset is less than 0.

7. The apparatus according to claim 5, wherein the processor is further configured to:
decode the current to-be-played part to generate decoded data; and
add the to-be-adjusted data to the decoded data when the Offset is less than 0.

8. A synchronous audio playback system, comprising:
a controlling device; and
a controlled device,
wherein the controlling device is configured to calculate a second playback delay $D_2$ generated when the controlling device plays the audio file, and
wherein the controlled device is configured to:
calculate a first playback delay ($D_1$) generated when the audio file is played;
acquire a second playback delay ($D_2$) generated when the controlling device plays the audio file;
calculate a delay offset Offset, wherein Offset=$D_1$−$D_2$;
calculate a data adjustment amount corresponding to an absolute value of the Offset when the Offset is not 0, wherein the data adjustment amount comprises a quantity of audio frames corresponding to the absolute value of the Offset, and wherein the data adjustment amount is calculated according to the following equation:

$$t = \frac{D \times 1000}{N \times P \times H}$$

where t is the absolute value of the Offset, D is the data adjustment amount corresponding to the absolute value of the Offset measured in bits, N is a quantity of sound channels, P is a quantity of bits per unit of data measured in bits, and H is a sampling rate measured in Hertz (Hz);
add to-be-adjusted data to or delete to-be-adjusted data from a current to-be-played part of the audio file according to a value of the Offset to obtain a replacement part corresponding to the current to-be-played part, wherein a data amount of the to-be-adjusted data is the data adjustment amount; and
play the replacement part.

9. The method according to claim 1, wherein calculating the first playback delay $D_1$ generated when the audio file is played comprises calculating the first playback delay $D_1$ generated when the audio file is played when second preset duration expires after a previous data addition operation or a previous data deletion operation is performed on the to-be-played part.

10. The method according to claim 1, wherein obtaining the replacement part comprises deleting the to-be-adjusted data whose data amount is the data adjustment amount from the current to-be-played part of the audio file when the Offset is greater than 0.

11. The method according to claim 1, wherein obtaining the replacement part comprises:
decoding the current to-be-played part to generate decoded data; and
deleting the to-be-adjusted data whose data amount is the data adjustment amount from the decoded data when the Offset is greater than 0.

12. The apparatus according to claim 5, wherein the processor is further configured to delete the to-be-adjusted data from the current to-be-played part of the audio file when the Offset is greater than 0.

13. The apparatus according to claim 5, wherein the processor is further configured to:
  decode the current to-be-played part to generate decoded data; and
  delete the to-be-adjusted data from the decoded data when the Offset is greater than 0.

14. The synchronous audio playback system according to claim 8, wherein the controlling device is further configured to add the to-be-adjusted data to the current to-be-played part of the audio file when the Offset is greater than or equal to a preset value.

15. The synchronous audio playback system according to claim 8, wherein the controlling device is further configured to add the to-be-adjusted data to the current to-be-played part of the audio file when the Offset is less than 0.

16. The synchronous audio playback system according to claim 8, wherein the controlling device is further configured to:
  decode the current to-be-played part to generate decoded data; and
  add the to-be-adjusted data to the decoded data when the Offset is less than 0.

17. The synchronous audio playback system according to claim 8, wherein the controlling device is further configured to:
  decode the current to-be-played part to generate decoded data; and
  delete the to-be-adjusted data from the decoded data when the Offset is greater than 0.

\* \* \* \* \*